United States Patent
Yasui et al.

(10) Patent No.: US 9,970,366 B2
(45) Date of Patent: May 15, 2018

(54) CONTROL APPARATUS

(71) Applicant: HONDA MOTOR CO., LTD., Tokyo (JP)

(72) Inventors: Yuji Yasui, Wako (JP); Toru Satake, Wako (JP); Kenichi Tajiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 353 days.

(21) Appl. No.: 14/666,855

(22) Filed: Mar. 24, 2015

(65) Prior Publication Data

US 2015/0275791 A1 Oct. 1, 2015

(30) Foreign Application Priority Data

Mar. 26, 2014 (JP) .................................. 2014-064410

(51) Int. Cl.
 *F02D 41/00* (2006.01)
 *F02D 41/14* (2006.01)
 (Continued)

(52) U.S. Cl.
 CPC .......... *F02D 41/0007* (2013.01); *F02B 37/24* (2013.01); *F02D 41/005* (2013.01);
 (Continued)

(58) Field of Classification Search
 CPC .... F02D 41/0007; F02D 41/005; F02B 45/00; F02B 37/22; F02B 37/24
 See application file for complete search history.

(56) References Cited

U.S. PATENT DOCUMENTS

| 8,489,309 | B2 * | 7/2013 | Nakayama | ............. F02M 26/49 |
| | | | | 123/696 |
| 2011/0077836 | A1 * | 3/2011 | Ejiri | .................... F02D 41/0007 |
| | | | | 701/102 |

FOREIGN PATENT DOCUMENTS

| DE | 10 2010 046 456 A1 | 4/2011 |
| JP | 2000-220462 A | 8/2000 |

(Continued)

OTHER PUBLICATIONS

Japanese Office Action application No. 2014-064410 dated Nov. 22, 2016.

(Continued)

*Primary Examiner* — Kevin A Lathers
(74) *Attorney, Agent, or Firm* — Squire Patton Boggs (US) LLP

(57) ABSTRACT

A control apparatus using a feedback control algorithm including an integral term, which is capable of controlling a controlled object having a response lag characteristic while suppressing influences of aging and sudden changes in an operating state, and thereby improving control accuracy. The control apparatus that controls a supercharger includes an ECU. The ECU calculates a reference FB target pressure using a first-order lag equation, an allowable upper limit value based on a value obtained by adding a predetermined allowable range value to the reference FB target pressure, an FB target pressure such that an actual boost pressure does not exceed the allowable upper limit value, and a feedback correction term using a PI control algorithm such that the actual boost pressure becomes equal to the FB target pressure, and controls the actual boost pressure using a driver demand boost pressure and the feedback correction term.

6 Claims, 13 Drawing Sheets

(51) Int. Cl.
*F02B 37/24* (2006.01)
*F02D 41/10* (2006.01)
(52) U.S. Cl.
CPC ..... *F02D 41/1401* (2013.01); *F02D 41/1497* (2013.01); *F02D 41/0062* (2013.01); *F02D 41/0077* (2013.01); *F02D 41/10* (2013.01); *F02D 2041/1409* (2013.01); *F02D 2041/1422* (2013.01); *F02D 2041/1431* (2013.01); *F02D 2041/1432* (2013.01); *F02D 2200/602* (2013.01); *Y02T 10/144* (2013.01); *Y02T 10/47* (2013.01)

(56) References Cited

FOREIGN PATENT DOCUMENTS

| | | | |
|---|---|---|---|
| JP | 2005-171893 A | 6/2005 | |
| WO | 2008/143363 A1 | 11/2008 | |

OTHER PUBLICATIONS

Felix Richert, "Objektorientierte Modellbildung und Nichtlineare Pradiktive Regelung von Dieselmotoren" Dec. 22, 2015.
German Search Report application No. 10 2015 205 194.3 dated Dec. 15, 2015.
German Examination Report application No. 10 2015 205 194.3 dated Dec. 15, 2015.

* cited by examiner

CONTROL APPARATUS

BACKGROUND OF THE INVENTION

Field of the Invention

The present invention relates to a control apparatus for controlling a controlled object having a response lag characteristic, including an internal combustion engine and an accessory device thereof.

Description of the Related Art

Conventionally, as a control apparatus, one disclosed in Japanese Laid-Open Patent Publication (Kokai) No. 2005-171893 is known. This control apparatus controls boost pressure by controlling a variable nozzle type turbocharger as a controlled object. This control apparatus calculates a target boost pressure epimtrg according to operating conditions of the engine, and feedback-controls an actual boost pressure epim such that the actual boost pressure epim becomes equal to the target boost pressure epimtrg, using a feedback control algorithm including an integral term.

With this feedback control algorithm, a boost pressure difference epimdlt, which is a difference between the actual boost pressure epim and the target boost pressure epimtrg, is calculated, and a feedback control term epvnpmfb is calculated based on the boost pressure difference epimdlt, as a total sum of a proportional term epvnpmp, an integral term epvnpmi, and a derivative term epvnpmd, by a PID control method. Further, a sum epbnbse+epvnpmfb of the feedback control term epvnpmfb and a basic value epbnbse of boost pressure is compared with a predetermined minimum limiting value epvnpmin, and then the larger one of them is compared with a predetermined maximum limiting value epvnpmax, whereby the larger one of them is set as a final opening epvnfin. Then, the actual boost pressure epim is feedback-controlled such that the actual boost pressure epim becomes equal to the target boost pressure epimtrg by controlling supply current to a DC motor according to the final opening epvnfin.

In calculation of the integral term epvnpmi, when predetermined update inhibiting conditions are satisfied in a transient operating condition of the engine, an update of the integral term epvnpmi is inhibited, and the integral term epvnpmi is maintained at the immediately preceding value thereof. This is for avoiding an overshoot of the actual boost pressure epim, because, in the case of the variable nozzle type turbocharger, the actual boost pressure epim has a characteristic of being liable to overshoot with respect to the target boost pressure epimtrg due to a response lag, and this problem becomes more conspicuous in a transient operating condition of the engine.

In the above conventional control apparatus, when the predetermined update inhibiting conditions are satisfied, the update of the integral term epvnpmi is inhibited, however, if it is determined that the predetermined update inhibiting conditions are not satisfied in a state where the actual boost pressure epim is below the target boost pressure epimtrg, the update of the integral term is started from the time of the determination. In this case, the integral term is increased after the start of the update of the integral term, which may result in overshoot of the actual boost pressure epim with respect to the target boost pressure epimtrg.

To avoid this inconvenience, if the update inhibition period of the integral term is set longer, after starting the update of the integral term, the actual boost pressure epim may not reach the target boost pressure epimtrg, or to the contrary, there may occur an excessive overshoot due to causing the actual boost pressure epim to be rapidly made closer to the target boost pressure epimtrg. The above problems become more conspicuous in a case where the variable nozzle type turbocharger suffers from variation in characteristics between individual products thereof or aging, and also become conspicuous under a condition that a sudden increase/decrease in the demand of output from the engine by a driver is repeated.

SUMMARY OF THE INVENTION

It is an object of the present invention to provide a control apparatus using a feedback control algorithm including an integral term, which is capable of controlling a controlled object having a response lag characteristic while suppressing influences of aging and sudden changes in an operating state, and thereby improving control accuracy.

To attain the above object, the present invention provides a control apparatus for controlling a controlled object having a response lag characteristic, including an internal combustion engine and an accessory device thereof, comprising controlled variable detection means for detecting a controlled variable of a controlled object, reference target value calculation means for calculating a reference target value that serves as a reference of a feedback target value that is a target value for feedback control, using a predetermined control algorithm on which the response lag characteristic is reflected, allowable upper limit value calculation means for calculating an allowable upper limit value by adding a predetermined allowable range value to the calculated reference target value, feedback target value calculation means for calculating a feedback target value such that the detected controlled variable does not exceed the allowable upper limit value, and control means for controlling the controlled object, using a predetermined feedback control algorithm including an integral term, such that the detected controlled variable becomes equal to the calculated feedback target value.

According to this control apparatus, a reference target value that serves as a reference of a feedback target value that is a target value for feedback control, is calculated using a control algorithm on which the response lag characteristic is reflected. Therefore, it is possible to calculate the reference target value as a value on which is reflected the response lag characteristic of the controlled object. Further, an allowable upper limit value is calculated by adding a predetermined allowable range value to the reference target value thus calculated, and a feedback target value is calculated such that the detected controlled variable does not exceed the allowable upper limit value. Further, the controlled object is controlled, using a predetermined feedback control algorithm including an integral term, such that the detected controlled variable becomes equal to the calculated feedback target value. Therefore, by properly setting the predetermined allowable range value, it is possible to cause the controlled variable to accurately follow the feedback target value, while suppressing separation of the controlled variable from the feedback target value, even under a condition that the integral term increases during feedback control, and thereby improve the control accuracy. For the same reason, even under a condition that the controlled object suffers from variation in characteristics between individual products thereof or aging, or that a sudden change in the operating state of the controlled object is repeated due to repetition of a sudden increase or decrease in the output of the engine demanded by a driver, it is possible to cause the controlled variable to accurately follow the feedback target value while suppressing influence of such states of the controlled object. Thus, it is possible to perform a high accuracy control, and ensure a high marketability (note that throughout the description, the term "detect" used in the phrase "detecting a controlled variable" is intended to mean not only directly detecting the controlled variable e.g. by a sensor but also calculating or estimating the controlled variable based on other parameters).

Preferably, the feedback target value calculation means calculates the feedback target value such that the feedback target value progressively approaches the controlled variable when the engine is in a decelerating state.

With the configuration of the preferred embodiment, when the engine is in a decelerating state, the feedback target value is calculated such that it progressively approaches the controlled variable. Therefore, it is possible to avoid an increase in integral term during deceleration of the engine even in a case where the controlled variable has a characteristic of being liable to significantly separate from the feedback target value during deceleration of the engine. This makes it possible to ensure a high stability and a high responsiveness in the feedback control when the engine is shifted from a decelerating state to an accelerating state.

Preferably, the controlled object is a supercharger, and the controlled variable is boost pressure of the supercharger.

In general, in a case where the boost pressure of the supercharger is feedback-controlled such that it becomes equal to the feedback target value, a response lag is liable to occur, and due to the response lag, in a transient operating condition of the engine, the boost pressure is liable to significantly separate from the feedback target value, and further, under a condition that the supercharge suffers from variation in characteristics between individual products thereof or aging, or that a sudden increase or decrease in the output of the engine demanded by a driver is repeated, there is a possibility that the degree of separation from the feedback target value is further increased. However, according to this control apparatus, when feedback-controlling the boost pressure such that it becomes equal to the feedback target value, the feedback target value is calculated, as described above, such that the boost pressure does not exceed the allowable upper limit value, and hence even under the above-described conditions, the boost pressure can be quickly converged to the feedback target value while suppressing separation of the boost pressure from the feedback target value, and thereby improve control accuracy of the boost pressure.

Preferably, the controlled object is an EGR device, and the controlled variable is an EGR amount of the EGR device.

In general, in a case where the EGR amount of the EGR device is feedback-controlled such that it becomes equal to the feedback target value, the EGR amount is liable to suffer from a response lag with respect to the feedback target value, and due to the response lag, in a transient operating condition of the engine, the EGR amount is liable to significantly separate from the feedback target value, and further, under a condition that the EGR device suffers from variation in characteristics between individual products thereof or aging, or that a sudden increase or decrease in the output of the engine demanded by a driver is repeated, there is a possibility that the degree of separation from the feedback target value is further increased. However, according to this control apparatus, when feedback-controlling the EGR amount such that it becomes equal to the feedback target value, the feedback target value is calculated, as described above, such that the EGR amount does not exceed the allowable upper limit value, and hence even under the above-described conditions, the EGR amount can be quickly converged to the feedback target value while suppressing separation of the EGR amount from the feedback target value, and thereby improve control accuracy of the EGR amount.

The above and other objects, features, and advantages of the present invention will become more apparent from the following detailed description taken in conjunction with the accompanying drawings.

DETAILED DESCRIPTION OF PREFERRED EMBODIMENTS

Figure 1:
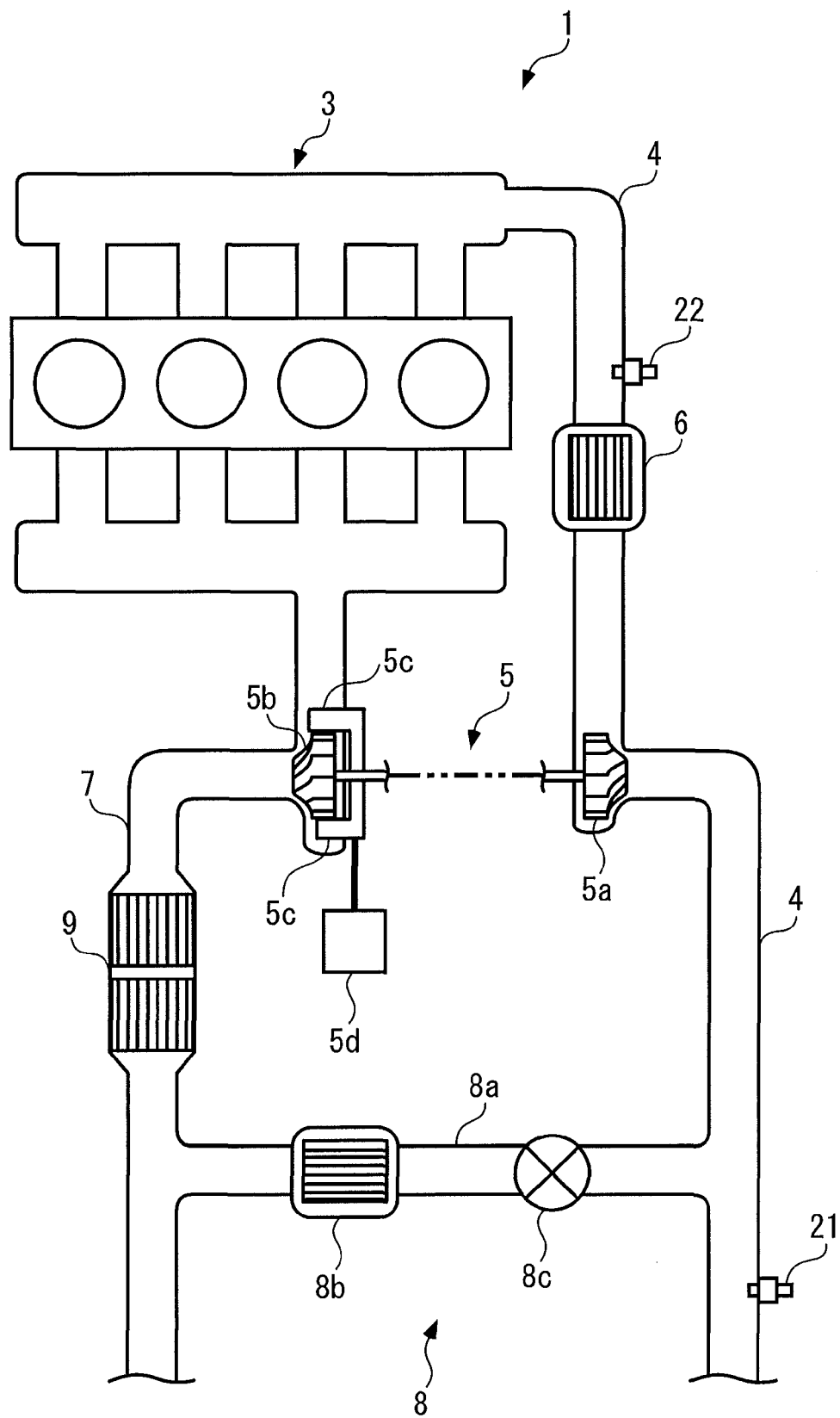
FIG. 1 is a schematic diagram of a control apparatus according to a first embodiment of the present invention, and an internal combustion engine including a supercharger to which is applied the control apparatus.
Figure 2:
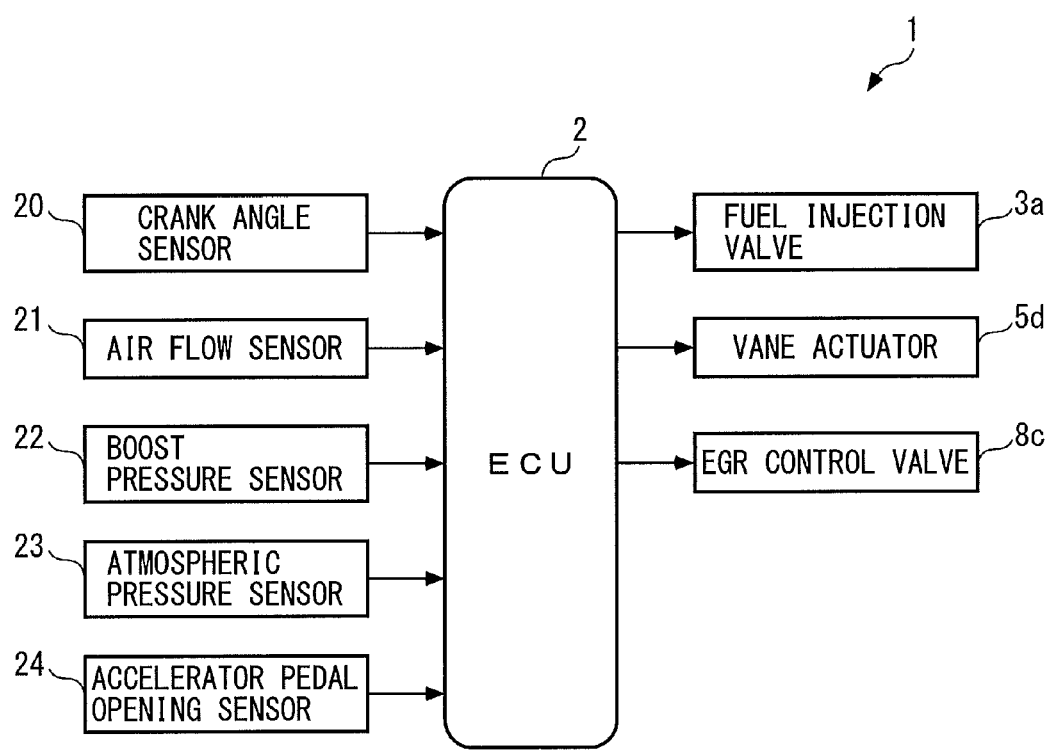
FIG. 2 is an electrical block diagram of the control apparatus.

Hereafter, a control apparatus according to a first embodiment of the present invention will be described with reference to the drawings. As shown in FIG. 1, an internal combustion engine (hereinafter referred to as "the engine") 3 is provided with a supercharger 5 as a controlled object, and the control apparatus 1 of the present embodiment controls boost pressure as a controlled variable by controlling the supercharger 5. The control apparatus 1 includes an ECU 2, as shown in FIG. 2, and as will be described hereinafter, a supercharge control process and other processes are performed by the ECU 2.

The engine 3 is of a four-cylinder diesel engine type, and is installed on a vehicle, not shown, as a motive power source. The engine 3 includes fuel injection valves 3a (only one of which is shown in FIG. 2) provided for respective cylinders, and each fuel injection valve 3a is electrically connected to the ECU 2. A fuel injection amount and fuel injection timing of the fuel injection valve 3a are controlled by the ECU 2 by controlling valve-opening timing and valve-closing timing of the fuel injection valve 3a.

Further, the above-described supercharger 5 and an intercooler 6 are disposed in intermediate portions of an intake passage 4 of the engine 3. The supercharger 5 is formed by a variable capacity turbocharger, and includes a compressor blade 5a which is disposed at a location upstream of the intercooler 6 in the intake passage 4, a turbine blade 5b which is provided in an intermediate portion of an exhaust passage 7 and rotates integrally with the compressor blade 5a, a plurality of variable vanes 5c (only two of which are shown), and a vane actuator 5d which actuates the variable vanes 5c.

In the supercharger 5, when the turbine blade 5b is driven for rotation by exhaust gases in the exhaust passage 7, the compressor blade 5a integrally formed therewith rotates at the same time, whereby the air in the intake passage 4 is pressurized, that is, a supercharging operation is performed.

The variable vanes 5c are for varying boost pressure generated by the supercharger 5, and are mechanically connected to the vane actuator 5d connected to the ECU 2. The ECU 2 changes a degree of opening of the variable vanes 5c via the vane actuator 5d to change the rotational speed of the turbine blade 5b, i.e. the rotational speed of the compressor blade 5a, whereby the boost pressure is changed.

Further, the intercooler 6 is of a water cooling type. When intake air passes through the intercooler 6, the intercooler 6 cools the intake air the temperature of which has been raised by the supercharging operation of the supercharger 5.

On the other hand, the above-described turbine blade 5b and a catalytic device 9 are provided in the exhaust passage 7 of the engine 3, from upstream in the mentioned order. The catalytic device 9 is for purifying the exhaust gases flowing through the exhaust passage 7, and is formed by combining a DOC (diesel oxidation catalyst) and a CSF (catalyzed soot filter).

Further, the engine 3 is provided with an EGR device 8. The EGR device 8 is for recirculating part of the exhaust gases in the exhaust passage 7 to the intake passage 4 side, and is comprised of an EGR passage 8a connected between the intake passage 4 and the exhaust passage 7, an EGR cooler 8b for cooling recirculated gases flowing through the EGR passage 8a, an EGR control valve 8c for opening and closing the EGR passage 8a, and so forth. One end of the EGR passage 8a opens into a portion of the exhaust passage 7 at a location downstream of the catalytic device 9, and the other end thereof opens into a portion of the intake passage 4 at a location upstream of the compressor blade 5a.

The EGR control valve 8c is implemented by a linear solenoid valve the degree of opening of which is linearly varied between a fully opened state and a fully closed state, and is electrically connected to the ECU 2. The ECU 2 changes the degree of opening of the EGR control valve 8c to thereby control the amount of the recirculated gases (hereinafter referred to as "the EGR amount").

As shown in FIG. 2, a crank angle sensor 20, an air flow sensor 21, a boost pressure sensor 22, an atmospheric pressure sensor 23, and an acceleration pedal opening sensor 24 are electrically connected to the ECU 2.

The crank angle sensor 20 is comprised of a magnet rotor and an MRE pickup, and delivers a CRK signal, which is a pulse signal, to the ECU 2 along with rotation of a crankshaft, not shown. Each pulse of the CRK signal is generated whenever the crankshaft rotates through a predetermined crank angle (e.g. 2°). The ECU 2 calculates a rotational speed NE of the engine 3 (hereinafter referred to as "the engine speed NE") based on the CRK signal.

The air flow sensor 21 is formed by a hot-wire air flow meter, and detects the flow rate of air flowing through the intake passage 4 (hereinafter referred to as "the intake air flow rate") to deliver a signal indicative of the detected intake air flow rate to the ECU 2. The ECU 2 calculates an intake air flow rate Gair based on the detection signal from the air flow sensor 21.

Further, the boost pressure sensor 22 is disposed in the intake passage 4 at a location downstream of the intercooler 6, and detects an actual pressure PBact in the intake passage 4, which has been pressurized by the supercharger 5 (hereinafter referred to as "the actual boost pressure PBact"), to deliver a signal indicative of the sensed actual boost pressure PBact to the ECU 2.

The atmospheric pressure sensor 23 is formed by a semiconductor pressure sensor, and detects an atmospheric pressure PA to deliver a signal indicative of the sensed atmospheric pressure PA to the ECU 2.

Further, the acceleration pedal opening sensor 24 detects a stepped-on amount AP of an accelerator pedal of a vehicle, not shown, (hereinafter referred to as "the accelerator pedal opening AP"), and delivers a signal indicative of the sensed accelerator pedal opening AP to the ECU 2.

The ECU 2 is implemented by a microcomputer comprised of a CPU, a RAM, a ROM, and an I/O interface (none of which are specifically shown). The ECU 2 performs various control processes including the supercharge control process, as described hereinafter, according to the detection signals from the aforementioned sensors 20 to 24 and so forth.

In the present embodiment, the ECU 2 corresponds to controlled variable detection means, reference target value calculation means, allowable upper limit value calculation means, feedback target value calculation means, and control means.

Figure 3:
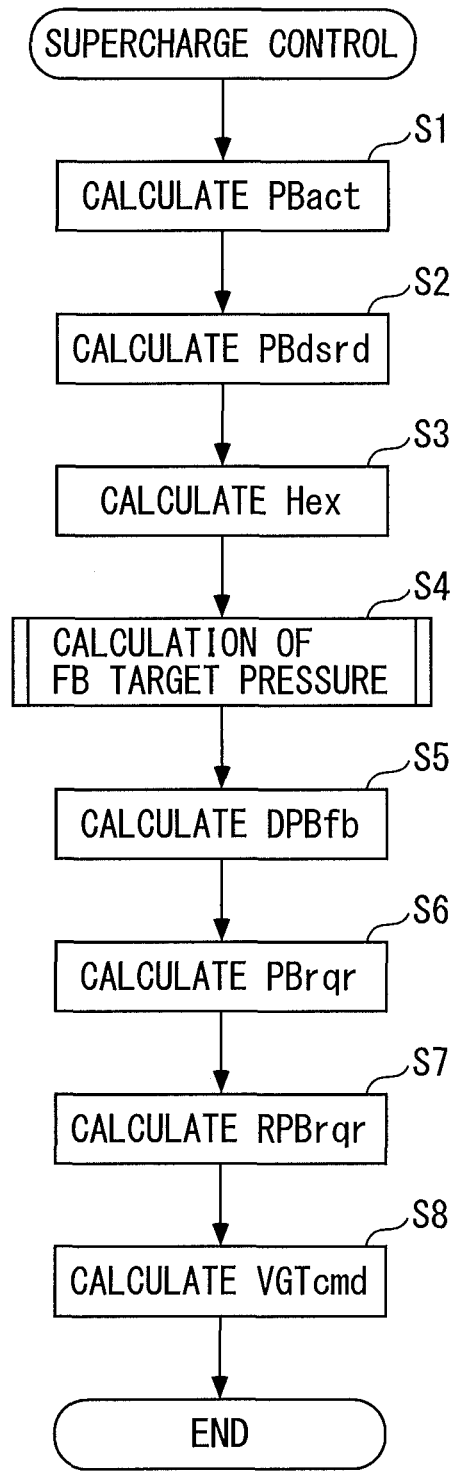
FIG. 3 is a flowchart of a supercharge control process.

Next, a description will be given of the supercharge control process with reference to FIG. 3. The supercharge control process is for controlling the actual boost pressure PBact by driving the vane actuator 5d, and is performed at a predetermined control period ΔT (e.g. 10 msec).

First, in a step 1 (shown as S1 in abbreviated form in FIG. 3; the following steps are also shown in abbreviated form), the actual boost pressure PBact is calculated based on the detection signal from the boost pressure sensor 22.

Next, the process proceeds to a step 2, wherein a driver demand boost pressure PBdsrd is calculated. The driver demand boost pressure PBdsrd is boost pressure that is demanded by the driver, and specifically, the driver demand boost pressure PBdsrd is calculated by searching a map shown in FIG. 4 according to a demanded torque TRQ and the engine speed NE.

Figure 4:
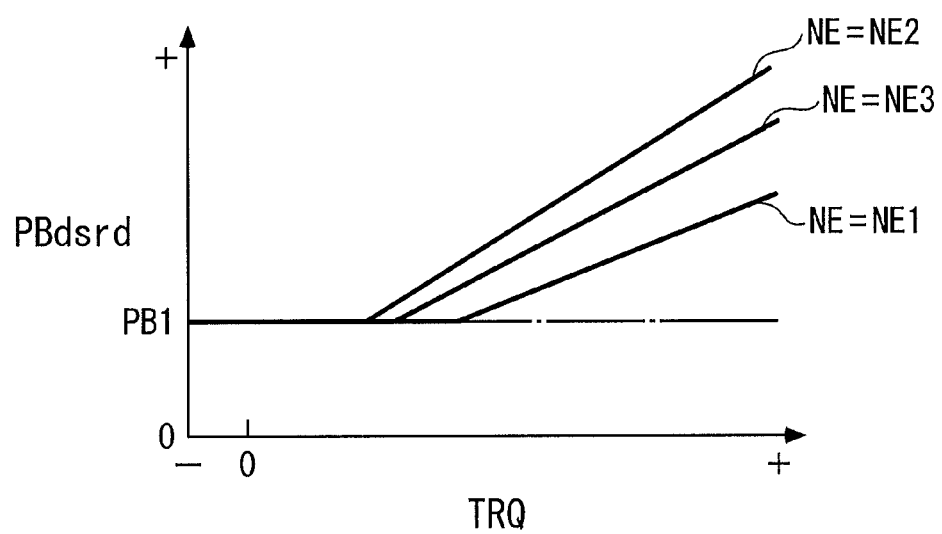
FIG. 4 is an example of a map for use in calculating a driver demand boost pressure PBdsrd.

In FIG. 4, PB1 represents a predetermined boost pressure, and NE1 to NE3 represent predetermined values of the engine speed NE that are set such that NE1<NE2<NE3 holds, respectively. Further, the demanded torque TRQ is an engine torque that is demanded by the driver, and is calculated according to the engine speed NE and the accelerator pedal opening AP in a fuel control process, not shown. Note that in this map, a negative value of the demanded torque TRQ corresponds to an engine torque obtained in a state in which the accelerator pedal is not stepped on, i.e. in an engine braking state during a decelerating fuel cut operation.

Next, in a step 3, an exhaust energy Hex is calculated by the following equation (1). The exhaust energy Hex corresponds to an energy that is given from exhaust gases to the turbine blade 5b of the supercharger 5.

$$Hex(k)=Gair(k)+\alpha(k) \cdot Gfuel(k) \quad (1)$$

Gfuel in the equation (1) represents an amount of fuel injected from the fuel injection valve 3a, and is calculated in the fuel control process, not shown. Further, $\alpha$ represents a correction coefficient that is set according to operating conditions of the engine 3. Further, in the above equation (1), discrete data with a symbol (k) indicates that it is data calculated or sampled in synchronism with the above-mentioned predetermined period $\Delta T$, and the symbol k (k is a positive integer) indicates a position in the sequence of sampling (or calculating) cycles of respective discrete data.

For example, the symbol k indicates that discrete data therewith is a value calculated in the current calculation timing, and a symbol k−1 indicates that discrete data therewith is a value calculated in the immediately preceding calculation timing. This also applies to discrete data referred to hereinafter. Further, in the following description, the symbol (k) provided for the discrete data is omitted as deemed appropriate.

In a step 4 following the step 3, a feedback target pressure calculation process is performed. This process calculates a feedback target pressure PBcmd that serves as a target to which the actual boost pressure PBact is to be feedback-controlled (hereinafter referred to as "the FB target pressure PBcmd"), and specifically, the FB target pressure PBcmd is calculated by an FB target pressure calculation process shown in FIG. 5.

Figure 5:
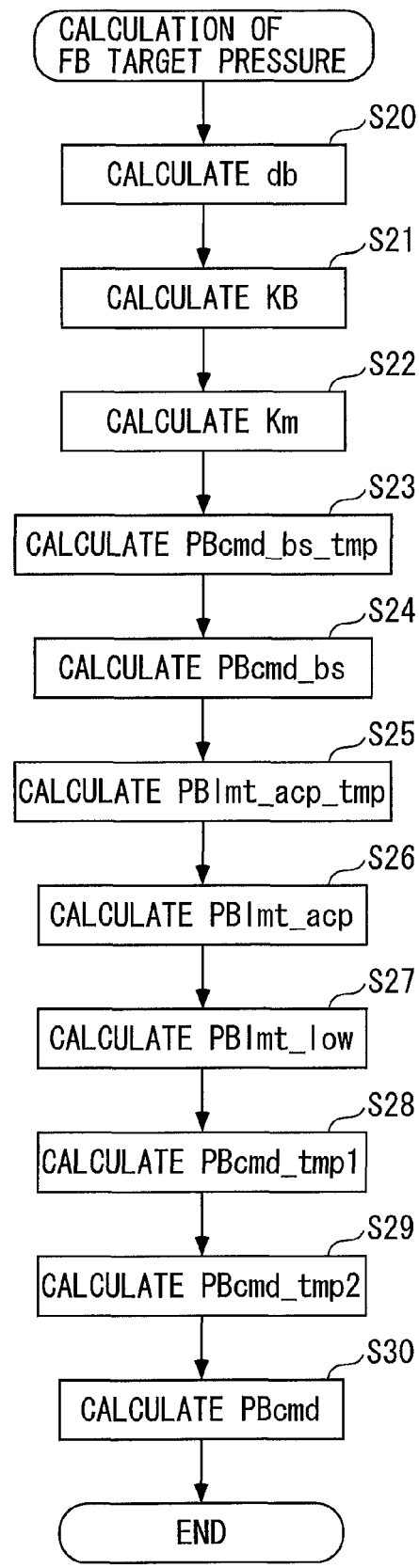
FIG. 5 is a flowchart of an FB target pressure calculation process.
Figure 6:
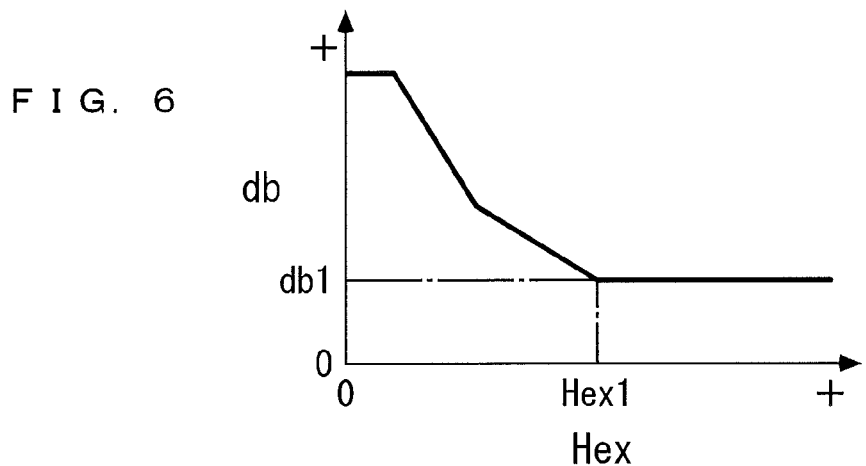
FIG. 6 is an example of a map for use in calculating a dead time db.

Referring to FIG. 5, first, in a step 20, a dead time db is calculated by searching a map shown in FIG. 6 according to the exhaust energy Hex.

The dead time db corresponds to a time period required for the driver demand boost pressure PBdsrd to be reflected on the actual boost pressure PBact, and is used in calculation of a provisional value PBcmd_bs_tmp of a reference FB target pressure, described hereinafter, and so forth. In this map, the dead time db is set to a predetermined value db1 in a region where the exhaust energy Hex is not smaller than a predetermined value Hex1, and in a region where Hex<Hex1 holds, it is set to a larger value as the exhaust energy Hex is smaller. This is because as the exhaust energy Hex is smaller, the responsiveness of the supercharger 5 is lower, so that the dead time becomes larger.

Figure 7:
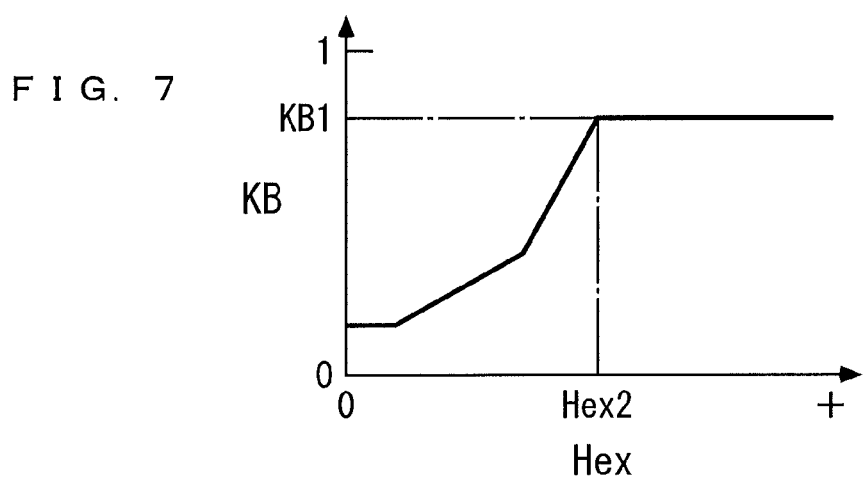
FIG. 7 is an example of a map for use in calculating a lag coefficient KB.

Next, the process proceeds to a step 21, wherein a lag coefficient KB is calculated by searching a map shown in FIG. 7 according to the exhaust energy Hex.

As shown in FIG. 7, the lag coefficient KB is used e.g. in calculation of the provisional value PBcmd_bs_tmp of the reference FB target pressure, referred to hereinafter. The lag coefficient KB is set to a fixed value KB1 (<1) in a region where the exhaust energy Hex is not smaller than a predetermined value Hex2, and in a region where Hex<Hex2 holds, it is set to a smaller value as the exhaust energy Hex is smaller. The reason for this will be described hereinafter.

Figure 8:
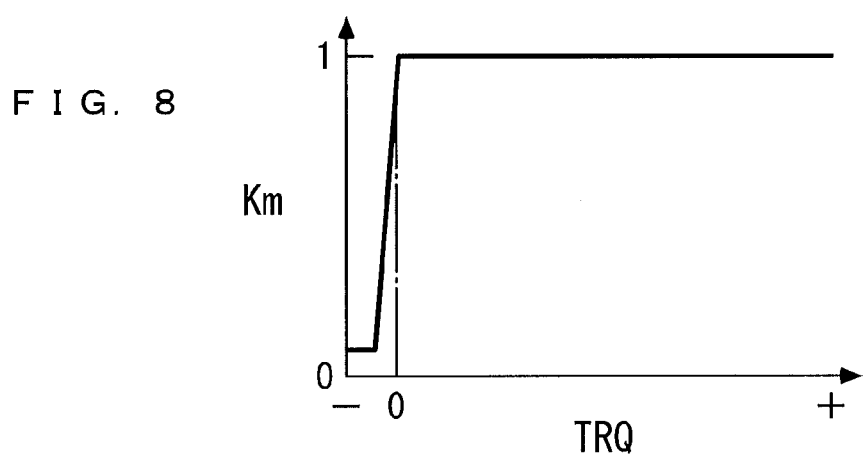
FIG. 8 is an example of a map for use in calculating a deceleration-time weight coefficient Km.

Next, in a step 22, a deceleration-time weight coefficient Km is calculated by searching a map shown in FIG. 8 according to the demanded torque TRQ.

The deceleration-time weight coefficient Km is used e.g. in calculation of a reference FB target pressure PBcmd_bs, referred to hereinafter. As shown in FIG. 8, in a region where TRQ≥0 holds, the deceleration-time weight coefficient Km is set to a value of 1, and in a region where TRQ<0 holds, it is set to a smaller value as the demanded torque TRQ is smaller. The reason for this will be described hereinafter.

In a step 23 following the step 22, the provisional value PBcmd_bs_tmp of the reference FB target pressure is calculated by a first-order lag calculation shown in the following equation (2):

$$PBcmd\_bs\_tmp(k)=(1-KB(k)) \cdot PBcmd\_bs(k-1)+ KB(k) \cdot PBdsrd(k-db(k)) \quad (2)$$

The reason for calculating the provisional value PBcmd_bs_tmp of the reference FB target pressure by the above equation (2) is in order to reflect the fact that in a case where the supercharger 5 is controlled using the driver demand boost pressure PBdsrd as a feedforward control term, the actual boost pressure PBact exhibits a first-order lag characteristic with respect to the driver demand boost pressure PBdsrd before the dead time db. That is, the provisional value PBcmd_bs_tmp of the reference FB target pressure is calculated as a value on which is reflected the response lag characteristic of the actual boost pressure PBact with respect to the driver demand boost pressure PBdsrd.

Further, as is apparent from the equation (2), as the lag coefficient KB is smaller, the immediately preceding value PBcmd_bs (k−1) of the reference FB target pressure is reflected on a calculation result of the provisional value PBcmd_bs_tmp of the reference FB target pressure to a larger degree than the driver demand boost pressure PBdsrd (k−(db(k))) before the dead time db is. Thus, under conditions that the exhaust energy Hex is smaller and the responsiveness of the supercharger 5 is lower, the lag coefficient KB is set as shown in FIG. 7 mentioned above so as to cause the immediately preceding value PBcmd_bs (k−1) of the reference FB target pressure to be more reflected on the result of the calculation of the provisional value PBcmd_bs_tmp of the reference FB target pressure.

Next, the process proceeds to a step 24, wherein the reference FB target pressure PBcmd_bs is calculated by weighted average calculation shown in the following equation (3):

$$PBcmd\_bs(k)=Km(k) \cdot PBcmd\_bs\_tmp(k)+(1-Km(k)) \cdot PBact(k) \quad (3)$$

As is apparent from the above equation (3), as the deceleration-time weight coefficient Km is smaller, the actual boost pressure PBact is reflected on a calculation result of the reference FB target pressure PBcmd_bs to a larger degree than the provisional value PBcmd_bs_tmp of the reference FB target pressure is. That is, the reference FB target pressure PBcmd_bs is made closer to the actual boost pressure PBact. Thus, when the demanded torque TRQ is in a negative value region and it is during a decelerating fuel cut operation of the engine, the deceleration-time weight coefficient Km is set as shown in FIG. 8 mentioned above such that the reference FB target pressure PBcmd_bs is caused to be progressively closer to the actual boost pressure PBact.

Next, in a step 25, a provisional value PBlmt_acp_tmp of the allowable upper limit value is calculated by the following equation (4):

$$PBlmt\_acp\_tmp(k)=PBcmd\_bs(k)+DPB\_ACP \quad (4)$$

DPB_ACP in the equation (4) represents a predetermined allowable range value, and is set to a positive fixed value.

In a step 26 following the step 25, an allowable upper limit value PBlmt_acp is calculated by the following equation (5):

$$PBlmt\_acp(k) = \mathrm{MIN}(PBlmt\_acp\_tmp(k), PBdsrd(k)) \quad (5)$$

MIN( ) in the equation (5) represents a minimum value selection function that selects a minimum value of two values in the parentheses. As is apparent from the equation (5), the allowable upper limit value PBlmt_acp is calculated as a smaller one of the provisional value PBlmt_acp_tmp of the allowable upper limit value and the driver demand boost pressure PBdsrd, so that the allowable upper limit value PBlmt_acp is calculated as a value obtained by performing an upper limit process on the provisional value PBlmt_acp_tmp thereof using the driver demand boost pressure PBdsrd as a upper limit value such that the allowable upper limit value PBlmt_acp does not exceed the driver demand boost pressure PBdsrd.

Next, the process proceeds to a step 27, wherein an allowable lower limit value PBlmt_low is calculated by the following equation (6):

$$PBlmt\_low(k) = \mathrm{MIN}(PBlmt\_acp(k), PBact(k)) \quad (6)$$

As is apparent from the equation (6), the allowable lower limit value PBlmt_low is calculated as a smaller one of the allowable upper limit value PBlmt_acp and the actual boost pressure PBact.

Next, in a step 28, a first provisional value PBcmd_tmp1 of the FB target pressure is calculated by a first-order lag calculation shown in the following equation (7):

$$PBcmd\_tmp1(k) = (1-KB(k)) \cdot PBcmd(k-1) + KB(k) \cdot PBdsrd(k-db(k)) \quad (7)$$

As is apparent from the equation (7), as the lag coefficient KB is smaller, the immediately preceding value PBcmd (k−1) of the FB target pressure is reflected on a calculation result of the first provisional value PBcmd_tmp1 of the FB target pressure to a larger degree than the driver demand boost pressure PBdsrd (k−(db(k)) before the dead time db is. That is, under conditions that the exhaust energy Hex is smaller and the responsiveness of the supercharger 5 is lower, the immediately preceding value PBcmd (k−1) of the FB target pressure is more reflected on the result of the calculation of the first provisional value PBcmd_tmp1 of the FB target pressure.

In a step 29 following the step 28, a second provisional value PBcmd_tmp2 of the FB target pressure is calculated by weighted average calculation shown in the following equation (8):

$$PBcmd\_tmp2(k) = Km(k) \cdot PBcmd\_tmp1(k) + (1-Km(k)) \cdot PBact(k) \quad (8)$$

As is apparent from the above equation (8), as the deceleration-time weight coefficient Km is smaller, the actual boost pressure PBact is reflected on a calculation result of the second provisional value PBcmd_tmp2 to a larger degree than the first provisional value PBcmd_tmp1 of the FB target pressure is. As a consequence, the second provisional value PBcmd_tmp2 of the FB target pressure becomes closer to the actual boost pressure PBact when the demanded torque TRQ is in a negative value region and it is during decelerating fuel cut operation of the engine.

Next, the process proceeds to a step 30, wherein the FB target pressure PBcmd is calculated by the following equation (9), followed by terminating the present process.

$$PBcmd(k) = \mathrm{MAX}(PBcmd\_tmp2(k), PBlmt\_low(k)) \quad (9)$$

MAX( ) in the equation (9) represents a maximum value selection function that selects a maximum value of two values in the parentheses. As is apparent from the equation (9), the FB target pressure PBcmd is calculated as a larger one of the second provisional value PBcmd_tmp2 of the FB target pressure and the allowable lower limit value PBlmt_low, so that the FB target pressure PBcmd is calculated as a value obtained by performing a lower limit process on the second provisional value PBcmd_tmp2 thereof using the allowable lower limit value PBlmt_low as a lower limit value.

Referring again to FIG. 3, in the step 4, after the FB target pressure calculation process is performed as described above, the process proceeds to a step 5, wherein a feedback correction term DPBfb is calculated with a PI control algorithm shown in the following equations (10) and (11):

$$E\_PB(k) = PBact(k) - PBcmd(k) \quad (10)$$

$$DPBFB(k) = KP \cdot E\_PB(k) + KI \cdot \sum_{i=0}^{k} E\_PB(k-i) \quad (11)$$

E_PB in the above equation (10) represents a boost pressure difference, and KP and KI in the above equation (11) represent a predetermined proportional term gain and a predetermined integral term gain, respectively.

Next, the process proceeds to a step 6, wherein a demanded boost pressure PBrqr is calculated by the following equation (12):

$$PBrqr(k) = PBdsrd(k) + DPBfb(k) \quad (12)$$

Next, in a step 7, a demanded pressure ratio RPBrqr is calculated by the following equation (13):

$$RPBrqr(k) = \frac{PBrqr(k)}{PA(k)} \quad (13)$$

Figure 9:
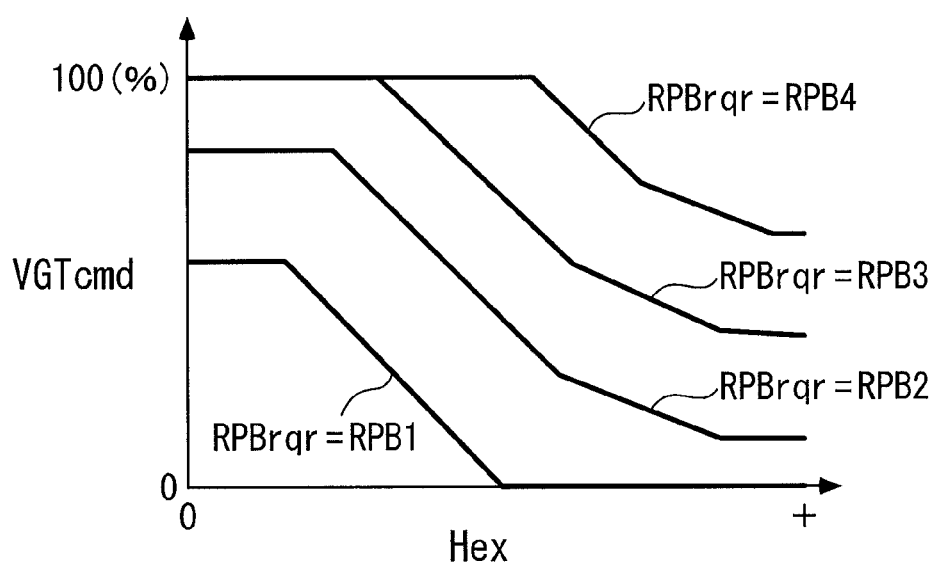
FIG. 9 is an example of a map for use in calculating a target vane opening VGTcmd.

In a step 8 following the step 7, a target vane opening VGTcmd is calculated by searching a map shown in FIG. 9 according to the exhaust energy Hex and the demanded pressure ratio RPBrqr, followed by terminating the present process. The target vane opening VGTcmd is a value which serves as a target of the opening degree of the variable vane 5c. In FIG. 9, RPB1 to RPB4 represent predetermined values of the demanded pressure ratio RPBrqr set such that RPB1<RPB2<RPB3<RPB4 holds.

In this map, the target vane opening VGTcmd is set to a smaller value as the exhaust energy Hex is larger in a region where the exhaust energy Hex is large. This is for releasing an excess energy to a location downstream of the turbine blade 5b as an energy of exhaust gases in order to maintain the boost pressure PB at the FB target pressure PBcmd, because in a region where the exhaust energy Hex is large, the exhaust energy Hex becomes sufficiently larger than the energy required for the compressor blade 5a of the supercharger 5 to compress intake pressure to the FB target pressure PBcmd. Further, the target vane opening VGTcmd is set to a larger value in order to obtain a larger boost pressure as the demanded pressure ratio RPBrqr is larger.

After the target vane opening VGTcmd is calculated as described above, a control input signal corresponding to the target vane opening VGTcmd is supplied to the vane actuator 5d, whereby the actual boost pressure PBact is feedback-controlled such that it follows the FB target pressure PBcmd, and controlled such that it becomes equal to the demanded boost pressure PBrqr.

Figure 10:
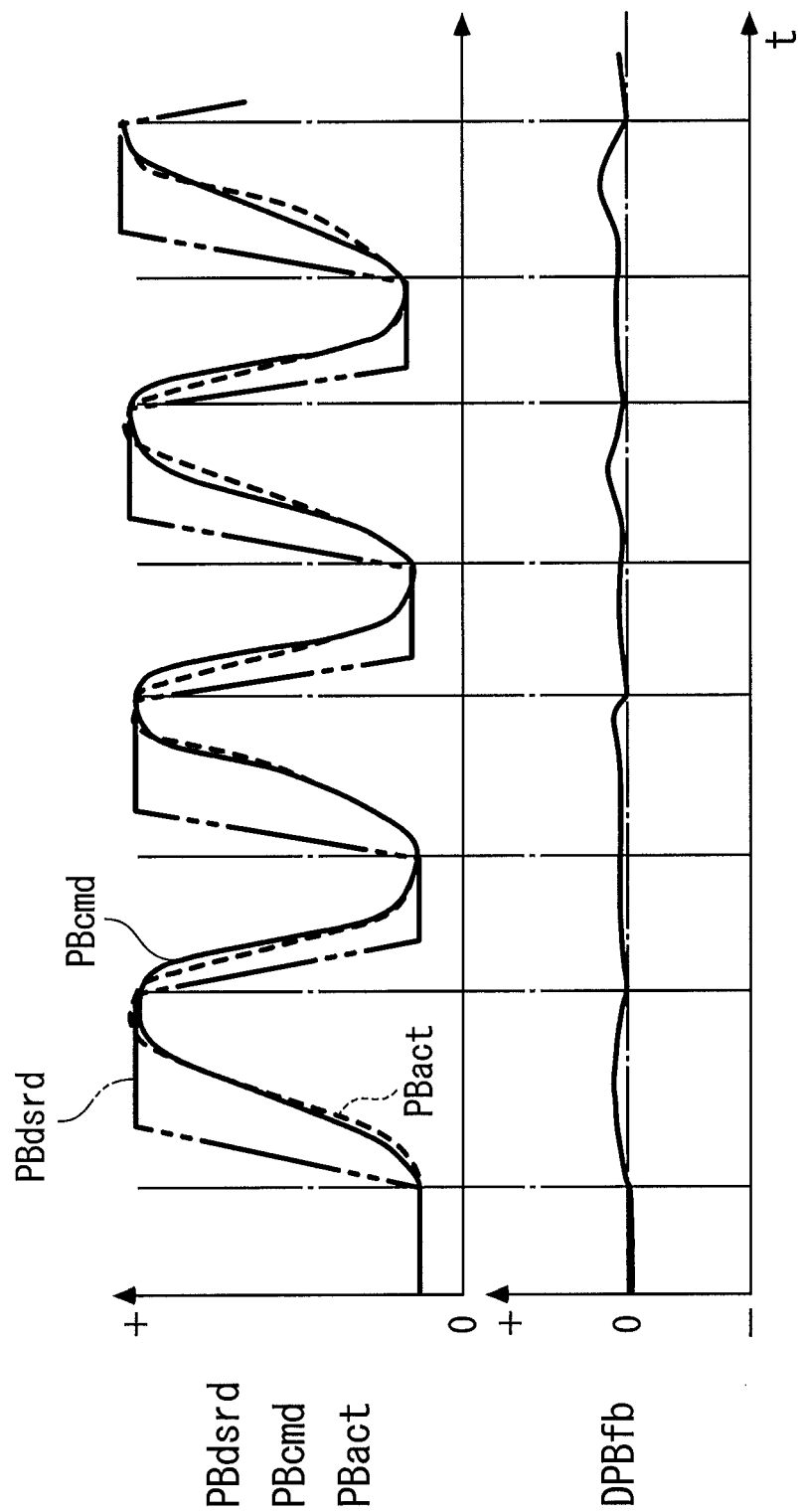
FIG. 10 is a timing diagram showing results of a simulation of the supercharge control process according to the first embodiment.

Next, a description will be given of results of a simulation of the supercharge control process which is performed by the control apparatus 1 according to the present embodiment configured as described above (hereinafter referred to as "control results"). FIG. 10 shows control results by the control apparatus 1 according to the present embodiment, in a case where the driver repeats acceleration and deceleration of the vehicle, causing the demanded boost pressure PBrqr to change in a trapezoidal waveform according to the periodical changes, in a trapezoidal waveform, of the demanded torque TRQ (or the accelerator pedal opening AP). Further, FIG. 11 shows, for comparison, control results in a case where as an algorithm for the FB target pressure PBcmd calculation, instead of the equations (2) to (9) of the present embodiment, an equation is used which is formed by replacing PBcmd_tmp1 representative of the first provisional value of the FB target pressure on the left side of the above-mentioned equation (7) by PBcmd representative of the FB target pressure (hereinafter referred to as "the comparative control results").

Figure 11:
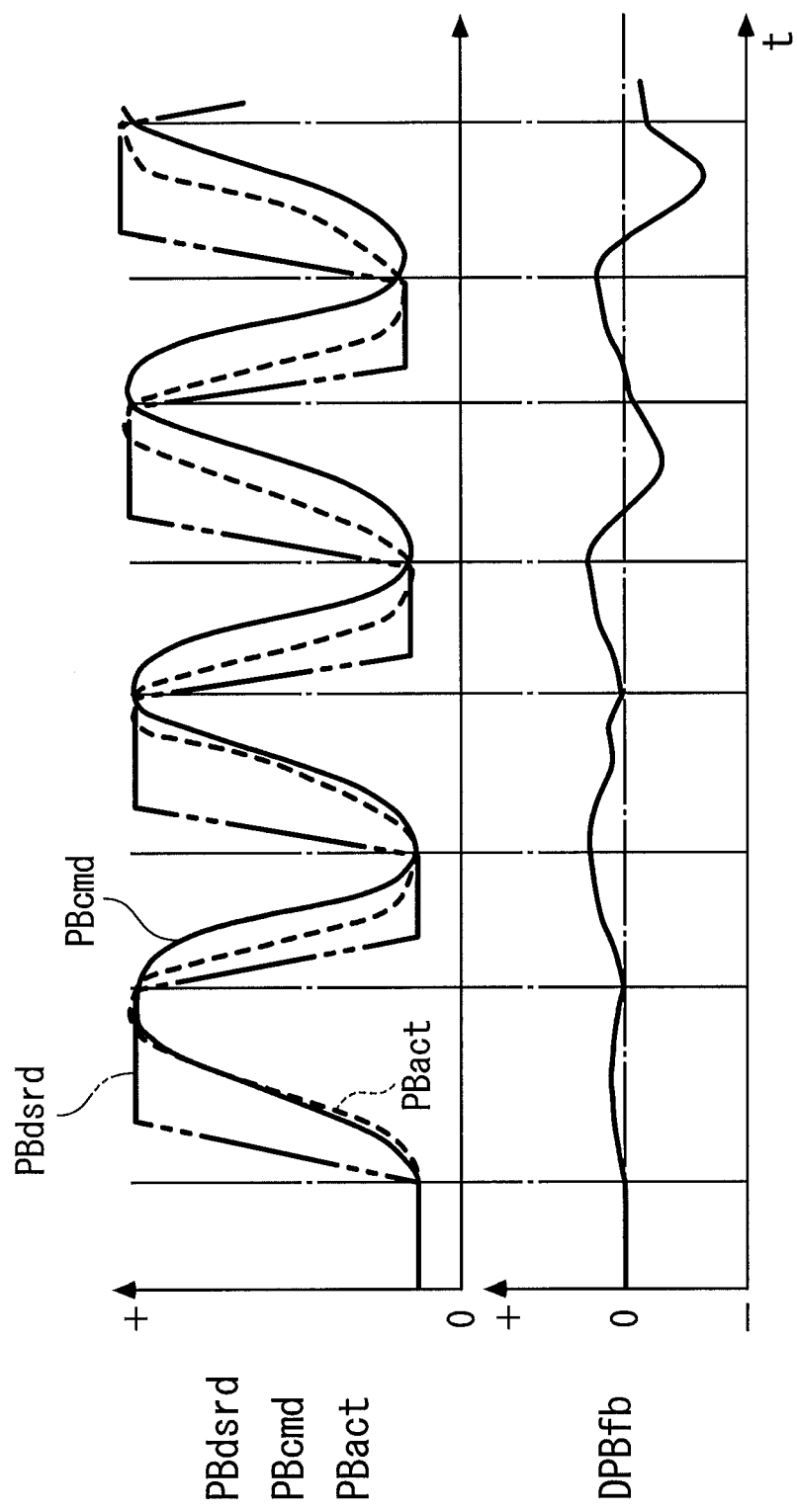
FIG. 11 is a timing diagram showing, for comparison, results of a simulation of the supercharge control process using an equation formed by replacing PBcmd_tmp1 representative of a first provisional value of an FB target pressure on the left side of equation (7) by PBcmd representative of the FB target pressure, as a calculation formula of the FB target pressure PBcmd.

To begin with, in the case of the comparative control results in FIG. 11, it is understood that the actual boost pressure PBact rapidly decreases after the start of deceleration of the vehicle, whereby the degree of separation thereof from the FB target pressure PBcmd becomes larger, and the degree of separation of the actual boost pressure PBact from the FB target pressure PBcmd increases as the control proceeds, whereby the absolute value of the feedback correction term DPBfb rapidly increases. That is, it is understood that the actual boost pressure PBact becomes unstable, and the control accuracy thereof is lowered.

In contrast, in the case of the control results according to the present embodiment in FIG. 10, it is understood that by using the weighted average calculation of the above-mentioned equation (8), after the start of deceleration of the vehicle, the degree of separation of the actual boost pressure PBact from the FB target pressure PBcmd remains smaller compared with the comparative control results, and even after the control proceeds, the degree of separation of the actual boost pressure PBact from the FB target pressure PBcmd is still small, and the absolute value of the feedback correction term DPBfb does not increase. In short, it is understood that by using the control algorithm of the equations (2) to (9) of the present embodiment, it is possible to cause the actual boost pressure PBact to accurately follow the FB target pressure PBcmd, whereby high control accuracy can be obtained.

Next, a description will be given, with reference to FIGS. 12 to 14, of control results by the control apparatus 1 according to the present embodiment in a case where the actual boost pressure PBact shifts in three different states after the start timing of acceleration of the vehicle, i.e. after the start timing of increase in the driver demand boost pressure PBdsrd. Note that in FIGS. 12 to 14, data items of the reference FB target pressure PBcmd_bs before the start of acceleration (i.e. before time points t2, t12, and t22) are omitted for ease of understanding.

Figure 12:
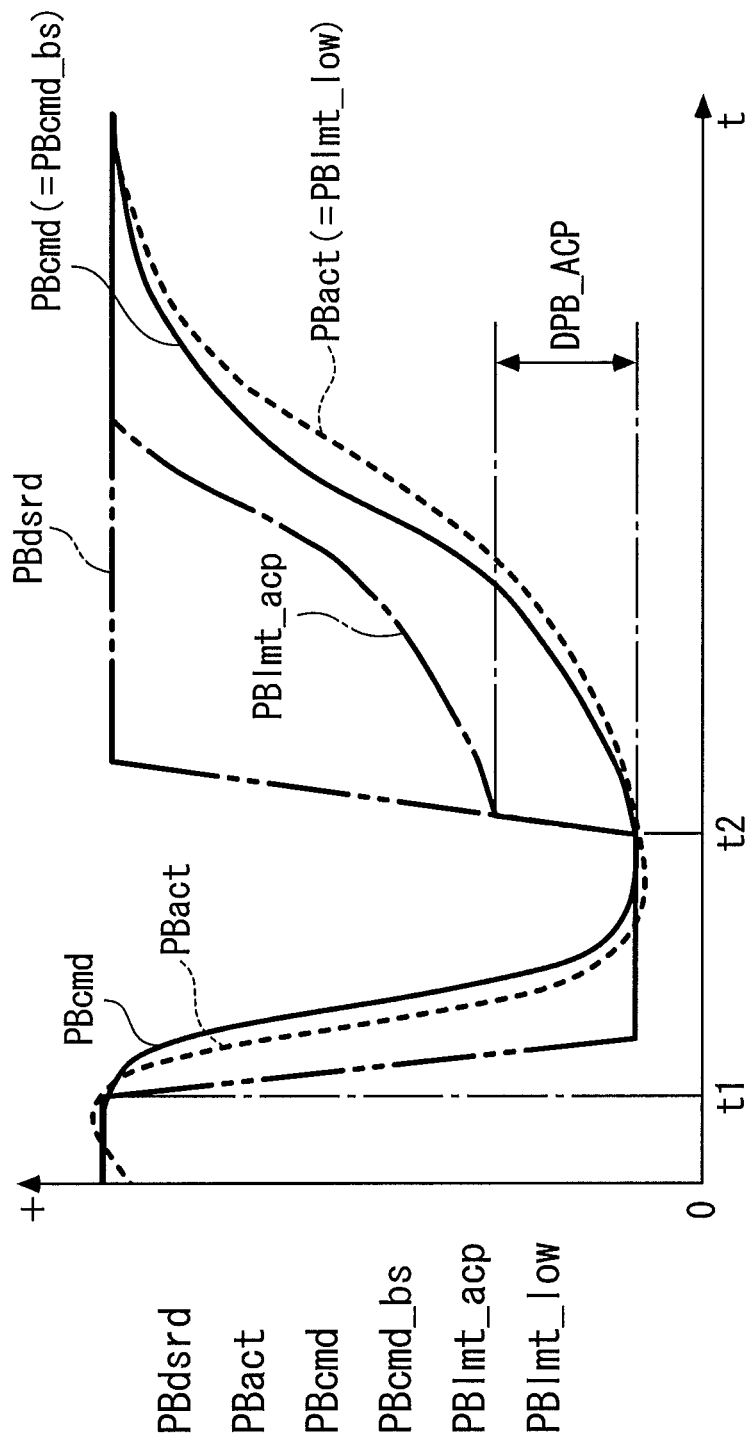
FIG. 12 is a timing diagram showing an example of results of a simulation of the supercharge control process when PBact<PBcmd_bs holds after the start of acceleration of a vehicle.

FIG. 12 shows control results when PBact<PBcmd_bs holds after the start timing of acceleration of the vehicle (time point t2). In this case, PBlmt_low=PBact is calculated from the above-mentioned equation (6), whereby PBcmd=PBcmd_tmp2 results from the above-mentioned equation (9).

Further, in the above-mentioned equation (8), Km=1 holds and PBcmd_tmp2=PBcmd_tmp1 holds, so that PBcmd=PBcmd_tmp1 holds, and hence the FB target pressure PBcmd is calculated by the equation (7). As a consequence, the FB target pressure PBcmd changes, exhibiting a first-order lag characteristic with respect to the driver demand boost pressure PBdsrd (k−db) before the dead time db, and the actual boost pressure PBact changes in a manner following the FB target pressure PBcmd.

Figure 13:
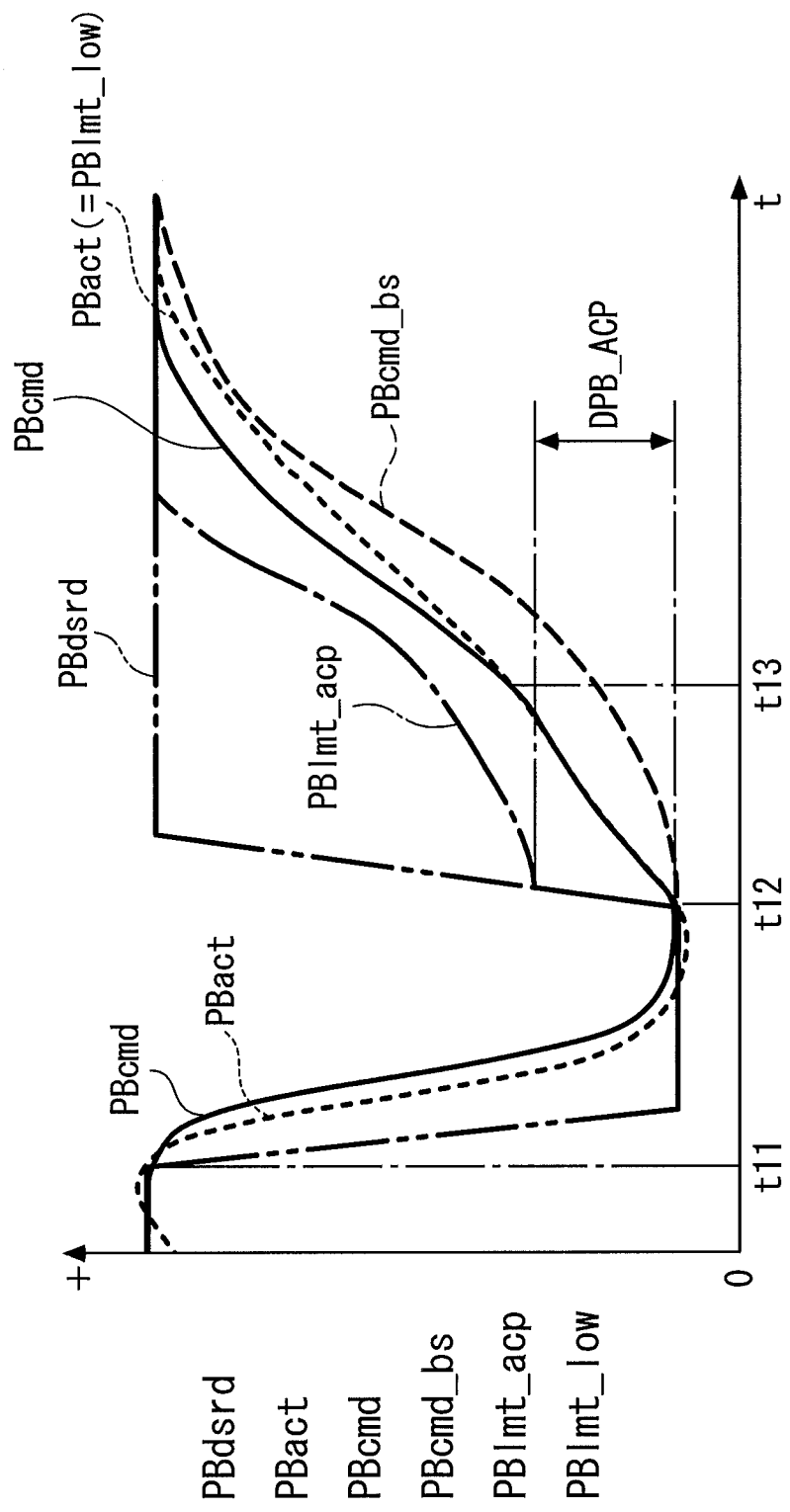
FIG. 13 is a timing diagram showing results of a simulation of the supercharge control process when PBcmd_bs<PBact<PBlmt_acp holds after the start of acceleration of the vehicle.

On the other hand, FIG. 13 shows control results under a condition that PBcmd_bs<PBact<PBlmt_acp holds after the start timing of acceleration of the vehicle (time point t12). In this case, under a condition that PBcmd_bs<PBact<PBlmt_acp holds, PBlmt_low=PBact is calculated from the above-mentioned equation (6). Further, between time points t12 and t13, PBcmd_tmp2<PBlmt_low holds, so that PBcmd=PBlmt_low is calculated from the above-mentioned equation (9), whereby PBcmd=PBact results.

Then, after a time point t13, PBlmt_low<PBcmd_tmp2 holds, so that PBcmd=PBcmd_tmp2 is calculated from the above-mentioned equation (9). This causes the FB target pressure PBcmd to change, exhibiting a first-order lag characteristic with respect to the driver demand boost pressure PBdsrd (k−db) before the dead time db, in a state exceeding the actual boost pressure PBact, and the actual boost pressure PBact changes in a manner following the FB target pressure PBcmd.

Figure 14:
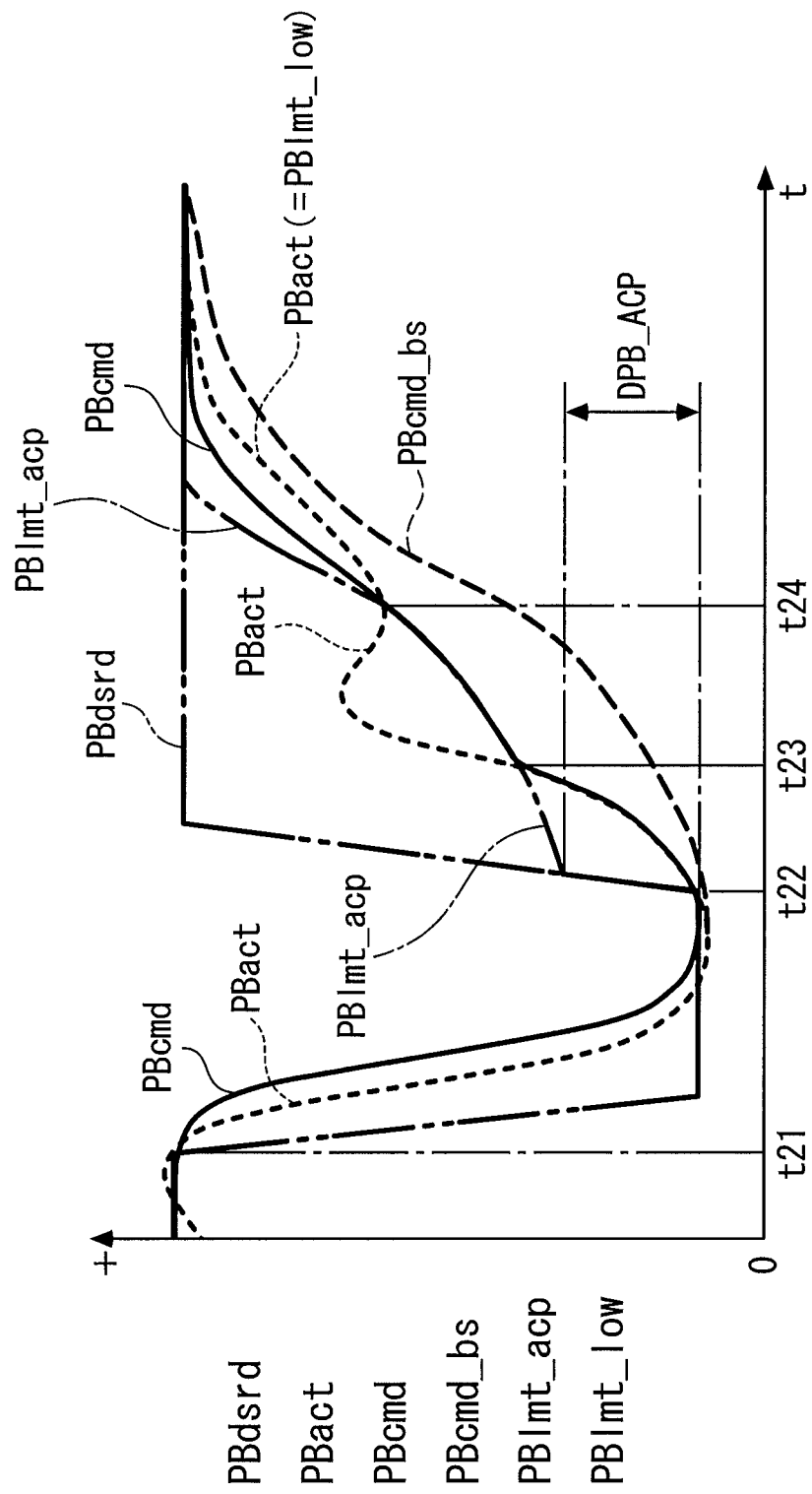
FIG. 14 is a timing diagram showing results of a simulation of the supercharge control process when PBlmt_acp<PBact temporarily holds after the start of acceleration of the vehicle.

Further, FIG. 14 shows control results when PBlmt_acp<PBact temporarily holds between time points t23 to t24 after the start timing of acceleration of the vehicle (time point t22). In this case, between time points t22 to t23, PBcmd_bs<PBact<PBlmt_acp holds, so that PBcmd=PBact results as described above.

Then, at the time point t23, when PBlmt_acp<PBact holds, thereafter, PBlmt_low=PBlmt_acp is calculated from the above-mentioned equation (6), whereby PBcmd=PBlmt_low=PBlmt_acp is calculated from the above-mentioned equation (9). As a consequence, the actual boost pressure PBact is feedback-controlled such that it converges to the allowable upper limit value PBlmt_acp.

As the control proceeds, when PBact≤PBlmt_acp holds at the time point t24, PBcmd=PBcmd_tmp2 results from the above-mentioned equation (9), whereafter the FB target pressure PBcmd is calculated by the equation (7). As a consequence, the FB target pressure PBcmd changes, exhibiting a first-order lag characteristic with respect to the driver demand boost pressure PBdsrd (k−db) before the dead time db in a state exceeding the actual boost pressure PBact, and the actual boost pressure PBact changes in a manner following the FB target pressure PBcmd.

As described above, according to the control apparatus 1 of the present embodiment, in the case of controlling the supercharger 5 which has a response lag characteristic, the reference FB target pressure PBcmd_bs is calculated with the control algorithm (equation (2)) on which the response lag characteristic is reflected, and hence, it is possible to calculate the reference FB target pressure PBcmd_bs as a value on which the response lag characteristic of the supercharger 5 is reflected. Further, in the equation (4), the allowable upper limit value PBlmt_acp is calculated by adding the predetermined allowable range value DPB_ACP to the calculated reference FB target pressure PBcmd_bs, and further, by the equation (6), when the actual boost pressure PBact is larger than the allowable upper limit value PBlmt_acp, the allowable lower limit value PBlmt_low is set to the allowable upper limit value PBlmt_acp.

Next, the FB target pressure PBcmd is set to a larger one of the allowable lower limit value PBlmt_low and the second provisional value PBcmd_tmp2 of the FB target pressure by the equation (9), and the feedback correction term DPBfb is calculated such that the actual boost pressure PBact follows the FB target pressure PBcmd. Therefore, even if the actual boost pressure PBact temporarily exceeds the allowable upper limit PBlmt_acp, as the control proceeds, it is possible to control the actual boost pressure PBact such that it becomes lower than the allowable upper limit value PBlmt_acp. That is, it is possible to control the actual boost pressure PBact such that is does not exceed the allowable upper limit value PBlmt_acp.

Therefore, by properly setting the predetermined allowable range value DPB_ACP, it is possible to cause the actual boost pressure PBact to accurately follow the FB target pressure PBcmd while suppressing separation of the actual boost pressure PBact from the FB target pressure PBcmd, even under a condition that the integral term increases during feedback control, which makes it possible to improve the control accuracy.

Further, for the same reason, even under a condition that the supercharger 5 suffers from variation in characteristics between individual products thereof or aging, or that sudden increase and decrease of the driver demand boost pressure PBdsrd are repeated due to the demands of acceleration and deceleration repeated by the driver, it is possible to cause the actual boost pressure PBact to accurately follow the FB target pressure PBcmd while suppressing influence of such states of the supercharger 5. From above, in the case of controlling the supercharger 5 which has a response lag characteristic, it is possible to achieve high control accuracy, and ensure high marketability.

In addition, by using the equation (8), during decelerating fuel cut operation, the FB target pressure PBcmd is calculated such that it is made progressively closer to the actual boost pressure PBact, and hence it is possible to avoid an increase in the integral term even under a condition that due to opening of the accelerator pedal, the actual boost pressure PBact suddenly decreases and is liable to significantly separate from the FB target pressure PBcmd. This makes it possible to ensure a high stability and responsiveness in the feedback control when the engine 3 is shifted from decelerating fuel cut operation to normal operation.

Although in the first embodiment, the exhaust energy Hex is calculated by the above-described equation (1), by way of example, but the exhaust energy Hex may be calculated by the following equation (14):

$$Hex = Cp \cdot TA \left[ Gair + Gfuel \cdot \frac{(1 - \eta eng) \cdot Qfuel + Cp \cdot TA}{Cp \cdot TA} \right] \quad (14)$$

In the equation (14), Cp, TA, Qfuel, and ηeng represent constant pressure specific heat of air, intake temperature, a calorific value of fuel, and engine efficiency, respectively. In a case where the above equation (14) is used, compared with a case where the above-mentioned equation (1) is used, it is possible to enhance the calculation accuracy of the exhaust energy Hex. Further, under a condition that there is no problem in a lower calculation accuracy of the exhaust energy Hex, a calculation formula of Hex=Gair may be used by setting α=0 in the equation (1).

Further, although in the first embodiment, the PI control algorithm of the equations (10) and (11) is used as a predetermined feedback control algorithm, by way of example, the predetermined feedback control algorithm according to the present embodiment is not limited to this, but it is only required to include an integral term. For example, as the predetermined feedback control algorithm, a response-specifying control algorithm, such as a PID control algorithm and a sliding mode control algorithm, may be used.

Further, although in the first embodiment, a positive fixed value is used as the predetermined allowable range value DPB_ACP, by way of example, but the predetermined allowable range value DPB_ACP may be calculated by a method, such as a map search, according to operating conditions of the engine 3 (e.g. the engine speed NE and the demanded torque TRQ).

Figure 15:
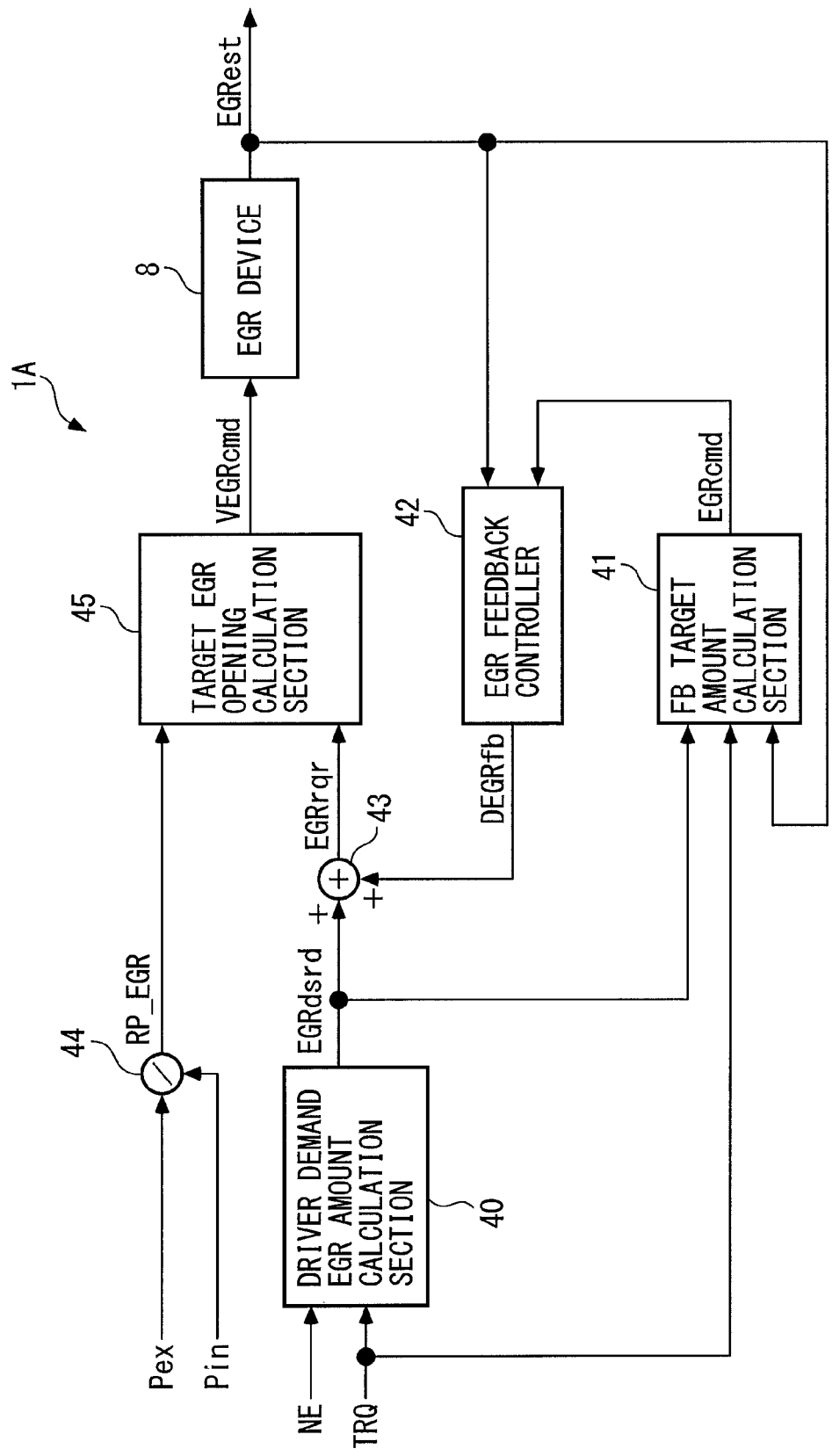
FIG. 15 is a functional block diagram of the control apparatus according to a second embodiment.

Next, a description will be given of a control apparatus 1A according to a second embodiment of the present invention with reference to FIG. 15. The control apparatus 1A according to the present embodiment controls an EGR amount as a controlled variable by controlling the EGR device 8 as a controlled object. As described hereinafter, the control apparatus 1A according to the present embodiment has the same electrical and mechanical arrangements as those of the control apparatus 1 according to the first embodiment, except part of them, so that hereinafter the same components as those of the first embodiment are denoted by the same reference numerals and description thereof is omitted.

The control apparatus 1A, as described hereafter, calculates a target EGR opening VEGRcmd by a method similar to the method employed by the control apparatus 1 according to the first embodiment. The control apparatus 1A includes a driver demand EGR amount calculation section 40, an FB target amount calculation section 41, an EGR feedback controller 42, an adder 43, a divider 44, and a target EGR opening calculation section 45, and specifically, these elements 40 to 45 are implemented by the ECU 2.

In the present embodiment, the ECU 2 corresponds to controlled variable detection means, reference target value calculation means, allowable upper limit value calculation means, feedback target value calculation means, and control means.

First, the driver demand EGR amount calculation section 40 calculates a driver demand EGR amount EGRdsrd by searching a map, not shown, according to the engine speed NE and the demanded torque TRQ.

Further, the FB target amount calculation section 41 calculates an FB target value EGRcmd by a method similar to the method employed in the above-described steps 20 to 30. Specifically, the FB target value EGRcmd is calculated using equations each formed by replacing PB in each parameter in the above-mentioned equations (2) to (9) by EGR.

That is, the FB target value EGRcmd is calculated by equations in which the PBcmd_bs representative of reference FB target pressure is replaced by EGRcmd_bs representative of a reference FB target amount, PBdsrd representative of the driver demand boost pressure by EGRdsrd representative of a driver demand EGR amount, DPB_ACP representative of the predetermined allowable range value by DEGR_ACP representative of a predetermined allowable range value, PBlmt_acp representative of the allowable upper limit value by EGRlmt_acp representative of an allowable upper limit value, and DPBfb representative of the feedback correction term by DEGRfb representative of a feedback correction term.

Further, the EGR feedback controller 42 calculates a feedback correction term DEGRfb by a method similar to the method employed in the above-described step 5. That is, the feedback correction term DEGRfb is calculated by equations in which PBact representative of the actual boost pressure is replaced by EGRest representative of the EGR amount, PBcmd representative of the FB target pressure by EGRcmd representative of an FB target amount, and E_PB representative of the boost pressure difference by E_EGR representative of an EGR amount difference.

In this case, the EGR amount EGRest is calculated based on a detection signal from an EGR amount sensor, not shown. Note that the EGR amount EGRest may be calculated based on other parameters (e.g. the intake air flow rate Gair and an air fuel ratio of exhaust gases).

On the other hand, the adder 43 calculates the demanded EGR amount EGRrqr by adding the feedback correction term DEGRfb to the driver demand EGR amount EGRdsrd.

Further, the divider 44 calculates a pressure ratio RP_EGR by dividing an exhaust pressure Pex by an intake pressure Pin. The pressure ratio RP_EGR is a ratio between a pressure on an upstream side of the EGR control valve 8c and a pressure on a downstream side of the same, and the exhaust pressure Pex and the intake pressure Pin are detected by respective pressure sensors, not shown.

Then, the target EGR opening calculation section 45 calculates the target EGR opening VEGRcmd by searching a map, not shown, according to the demanded EGR amount EGRrqr and the pressure ratio RP_EGR. After the target EGR opening VEGRcmd is thus calculated, a control input signal corresponding thereto is supplied to the EGR control valve 8c. This controls the EGR amount EGRest such that it follows the FB target amount EGRcmd, and such that it become equal to the driver demand EGR amount EGRdsrd.

According to the control apparatus 1A, by the above-described control method, it is possible to obtain the same advantageous effects as provided by the control apparatus 1 according to the first embodiment. That is, in the case of controlling the EGR device 8 which has a response lag characteristic, it is possible to cause the EGR amount EGR to accurately follow the FB target amount EGRcmd while suppressing separation of the EGR amount EGR from the FB target amount EGRcmd, even under a condition that the integral term increases during feedback control, which makes it possible to improve the control accuracy. Particularly even under conditions that the EGR device 8 suffers from variation in characteristics between individual products thereof or aging, and that acceleration and deceleration of the vehicle are repeatedly demanded by the driver, it is possible to cause the EGR amount EGR to accurately follow the FB target amount EGRcmd while suppressing the separation of the EGR amount EGR from the FB target amount EGRcmd.

Although in the first and second embodiments, as the controlled object, the supercharger 5 and the EGR device 8 are used, respectively, by way of example, the controlled object according to the present invention is not limited to them, but there may be used any other controlled object insofar as it is an internal combustion engine or an accessory device thereof. For example, as the controlled object and the controlled variable, there may be used an internal combustion engine and an air fuel ratio thereof, or a urea SCR system and a urea addition amount, respectively.

Further, although in the first and second embodiments, the control apparatus according to the present invention is applied to the supercharger and the EGR device for automotive vehicles, which are the controlled objects, respectively, by way of example, the control apparatus according to the present invention is not limited to them, but it may be applied to a controlled object, such as a supercharger and an EGR device for ships, and controlled objects for other industrial equipment.

It is further understood by those skilled in the art that the foregoing are preferred embodiment of the invention, and that various changes and modifications may be made without departing from the spirit and scope thereof.

What is claimed is:

1. A control apparatus for controlling a controlled object having a response lag characteristic, including an internal combustion engine and an accessory device thereof, comprising:
   controlled variable detection means for detecting a controlled variable of the controlled object;
   reference target value calculation means for calculating a reference target value using a predetermined control algorithm on which the response lag characteristic is reflected;
   allowable upper limit value calculation means for calculating an allowable upper limit value by adding a predetermined allowable range value to the calculated reference target value;
   feedback target value calculation means for calculating a feedback target value such that the detected controlled variable does not exceed the allowable upper limit value; and
   control means for controlling the controlled object by calculating a control input, using a predetermined feedback control algorithm including an integral term, such that the detected controlled variable becomes equal to the calculated feedback target value, and by inputting the calculated control input to the controlled object.

2. The control apparatus according to claim 1, wherein said feedback target value calculation means calculates the feedback target value such that the feedback target value progressively approaches the controlled variable when the engine is in a decelerating state.

3. The control apparatus according to claim 2, wherein the controlled object is a supercharger, and
   wherein the controlled variable is boost pressure of the supercharger.

4. The control apparatus according to claim 2, wherein the controlled object is an EGR device, and
   wherein the controlled variable is an EGR amount of the EGR device.

5. The control apparatus according to claim 1, wherein the controlled object is a supercharger, and
   wherein the controlled variable is boost pressure of the supercharger.

6. The control apparatus according to claim 1, wherein the controlled object is an EGR device, and
   wherein the controlled variable is an EGR amount of the EGR device.

* * * * *